Oct. 14, 1941.  E. R. PRICE  2,258,907
BRAKE
Filed April 4, 1938  2 Sheets-Sheet 1

INVENTOR.
EARL R. PRICE
BY Jerome R. Cox.
ATTORNEY.

Oct. 14, 1941.  E. R. PRICE  2,258,907
BRAKE
Filed April 4, 1938    2 Sheets-Sheet 2

INVENTOR.
EARL R. PRICE
BY Jerome R. Cox
ATTORNEY.

Patented Oct. 14, 1941

2,258,907

UNITED STATES PATENT OFFICE 2,258,907

BRAKE

Earl R. Price, South Bend, Ind., assignor to Bendix Products Corporation, South Bend, Ind., a corporation of Indiana Application April 4, 1938, Serial No. 199,737

18 Claims. (Cl. 188—152)

This invention relates to brakes and more particularly to a control valve and hookup for vacuum power brakes of the vacuum suspended type.

The vacuum suspended type of operation of vacuum power brakes has been found to be more rapid and in many other respects more desirable than the atmospheric type and has consequently become increasingly popular.

At the same time in both atmospheric and vacuum suspended systems the demand for means providing a reaction proportionate to brake application on the operating member has been growing. This has been accomplished for some time by various bulky and complicated systems of levers and the like, and in a copending application Serial No. 41,442, filed December 20, 1935, jointly by myself and Harold W. Price and in Patent No. 2,016,017 granted January 18, 1938, to the said Harold W. Price, an atmospheric suspended power brake system and a valve have been shown which provide reaction through a pressure responsive element in the valve, thereby eliminating the bulky and complicated lever system. Consequently, it is an object of this invention to provide a valve reaction system for vacuum suspended vacuum power brake systems.

My copending application Serial No. 282,089, filed June 30, 1939, is a division of this application and relates more particularly to the control valve per se.

Another object is to provide a novel valve for producing such a reaction.

A third object is to provide a simple, compact and economical hookup employing my novel valve.

A further object is to provide a valve and hookup which reduces the pedal travel necessary to operate the valve.

A still further object is to provide a power brake hookup permitting manual application of the brakes through strong, dependable connections external of the valve structure.

The above and other objects and desirable particular arrangements of parts will become apparent upon reference to the following detailed description of one embodiment of my invention shown in the accompanying drawings, in which.

Figure 1:
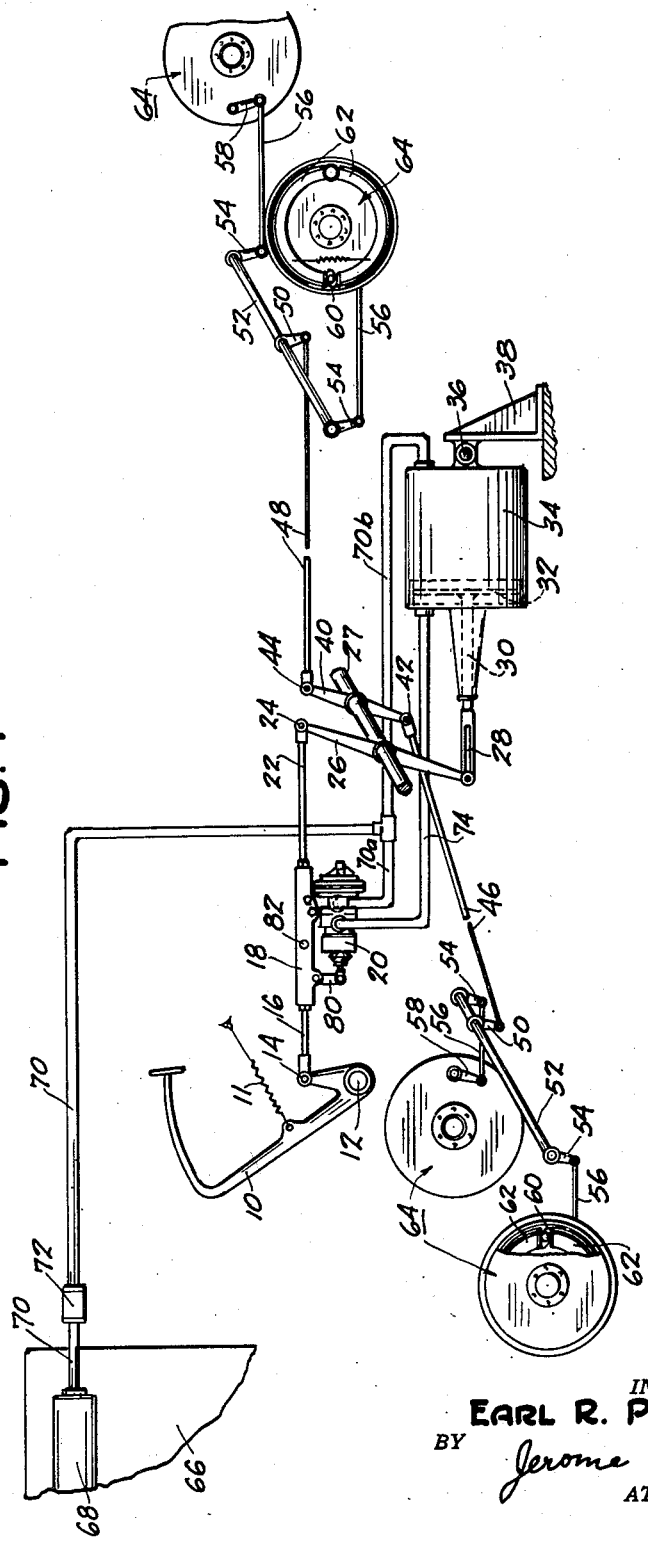
Figure 1 is a diagrammatic view of my novel brake system employing my novel valve.

Referring now to Figure 1, there is shown a brake system operable by means of a pedal 10 pivoted at 12 on some rigid part of the automobile chassis. The pedal 10 is provided with the usual return spring 11. Pivoted at 14 on the pedal 10 is one end of a brake rod 16, the other end of which is connected to a brake valve carrier 18 carrying my novel valve 20.

Another brake rod 22 extends from the rear of the carrier 18 and is pivotally connected at 24 to a cross-arm 26 centrally mounted on a cross-shaft 27 rockable in bearings (not shown) on the vehicle chassis. The other end of the cross-arm 26 is pivotally connected by a pin and slot lost motion device 28 to a piston rod 30 and piston 32 of the vacuum suspended vacuum brake cylinder 34. The cylinder 34 is swingably connected at 36 to a bracket 38 rigidly mounted on the chassis of the vehicle.

The cross-shaft 27 is provided with a second cross-arm 40 having its ends connected at 42 and 44 respectively to front and rear brake rods 46 and 48 which extend to the front and rear of the vehicle and are connected to arms 50 on cross-shafts 52. The cross-shafts 52 have pairs of additional arms 54 connected by links 56 to brake levers 58 adapted to rotate cams 60 and spread brake shoes 62 to apply the brakes which are designated generally by the numerals 64. I do not, however, desire to be limited to the last described structure in any way inasmuch as an infinite number of systems of brake connections from a cross-shaft have been devised.

The usual internal combustion engine 66 has the usual intake manifold 68 which provides a source of vacuum power. A vacuum conduit 70 provided with a check valve 72 extends therefrom and is formed with a branch 70a which is connected to my novel valve 20 and with a branch 70b which is connected to the rearward end of the vacuum power cylinder 34. Another conduit 74, which may be called the controlled pressure conduit, is connected between my novel valve 20 and the forward end of the vacuum power cylinder 34.

Figure 2:
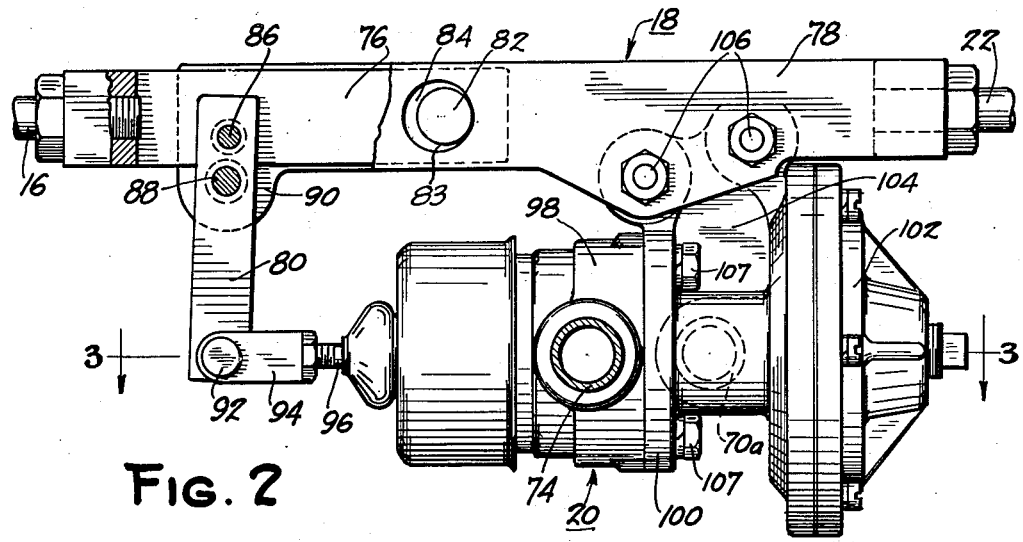
Figure 2 is an elevational view of my novel valve and valve carrier with parts broken away in section to show the arrangement of the levers.

Referring now particularly to Figure 2, my novel valve carrier 18 comprises two members 76 and 78 both of which are preferably forked, the rearward member 78 to receive between its furcations the member 76 and the member 76 to receive between its furcations one end of a valve lever 80.

The outer ends of the two members 76 and 78 are threadedly connected to the ends of the brake rods 16 and 22 respectively and adjacent their inner ends the two members are connected to each other by means of a pin 82 extending through drilled holes in all of the said furcations. The holes 84 in the members 78 are larger than the pin 82 to provide lost motion for operation of the valve while the holes 83 in the member 76 fit the pin 82 closely.

The valve lever 86 is pivotally connected at one end to the carrier member 76 by a pin 86 and is fulcrumed intermediate its ends but near the said one end on a pin 88 journaled in ears 90 projecting downwardly below the member 76 from the furcations of the member 78. The other end of the lever 86 pivotally receives at 92 a clevis 94 connected to a valve push rod 96. My novel valve 20 consists of three casing shell members 98, 100 and 102 of which the center member 100 is provided with an integral bracket 104 extending between the furcations of the carrier member 78 and secured thereto by means such as the bolts 106 or the like.

The casing members 98 and 100 are joined together by machine screws 107 to form between them a valve and controlled pressure chamber 108 provided with opposed valve seats 110 and 112, one of which is formed on each member.

The valve seat 110 surrounds a port leading to an air chamber 114 formed in the casing member 98 and which communicates with the atmosphere through ports 116 and an air cleaner 118 secured in annular relationship to the casing member 98. The member 98 is also formed with a port 120 leading from the controlled pressure chamber 108 to the controlled pressure conduit 74 previously described.

The valve seat 112 surrounds a port leading to a vacuum chamber 122 formed in the casing member 100 and which communicates through a port 124 with the vacuum conduit 70a.

The casing members 100 and 102 are secured together by machine screws 126 and have clamped between them the periphery of a diaphragm 128. Recesses 130 and 132 formed in the members 100 and 102 respectively form diaphragm chambers adjacent the opposite sides of the diaphragm 128. The chamber 130 communicates with the vacuum chamber 122 by means of a passage 134 and the chamber 132 communicates with the controlled pressure chamber 108 by means of a central longitudinal bore 136 formed in a valve plunger 138.

Figure 3:
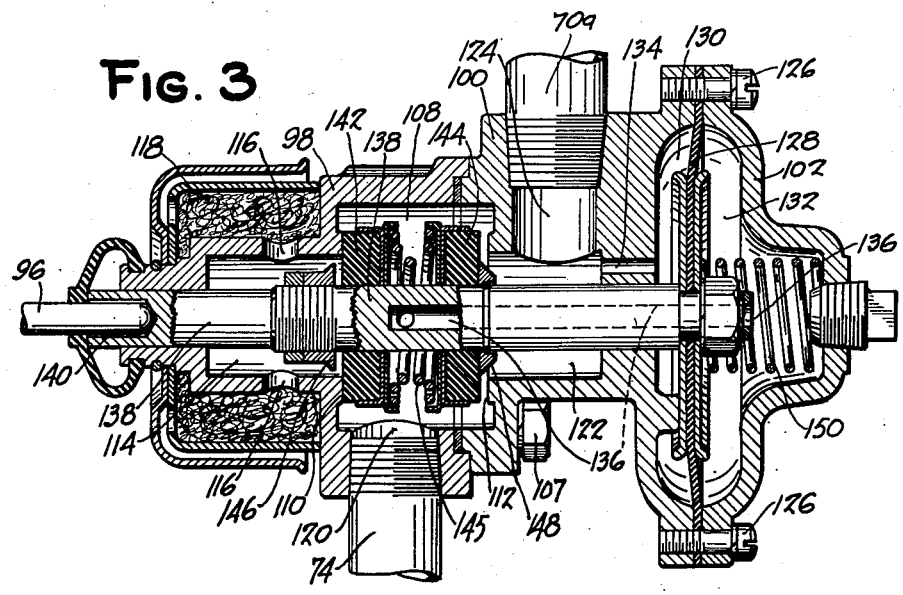
Figure 3 is a longitudinal section through the valve on the line 3—3 of Figure 2.

The valve plunger 138 is slidably mounted and extends coaxially through the casing members 98 and 100. The right-hand end as seen in Figure 3 is secured to the center of the diaphragm 128 and the left-hand end extends out of the casing member 98 and is formed with a socket 140 receiving the end of the valve push rod 96.

Within the valve chamber 108 are a pair of valve discs 142 and 144 slidably mounted on the plunger 138 and urged apart into contact with the respective valve seats 110 and 112 by a coiled spring 145 compressed between their inner faces. Adjacent the outer faces of the valve discs 142 and 144 are abutments 146 and 148 secured to the plunger 138 and adapted to lift the respective valves from their seats when the plunger is moved in an appropriate direction, to the left as seen in Figure 3 to lift the vacuum valve 144 and to the right to lift the air valve 142. One of the abutments, e. g. 146, is preferably threadedly mounted for adjustment and when properly adjusted, the abutments are spaced apart a distance approximately equal to the distance between the valve seats 110 and 112 whereby both valves may be moved to a position in which both are substantially closed.

A coiled spring 150 is compressed between the casing member 102 and the diaphragm 128 to urge the plunger 138 to the left and open the vacuum valve 144 to admit vacuum to the controlled pressure chamber 108 and therethrough by means of the port 120 to the controlled pressure conduit 74 and the forward end of the vacuum cylinder 34. Thus it will be seen that, since the other end of the cylinder is at all times connected to vacuum through the conduit 70b, the vacuum pressures on opposite sides of the piston 32 are balanced, whereby the normal return springs of the brakes (not shown) move the piston 32 to the left and cause the brakes to be released.

In operation, the brakes are applied in the usual way by depressing the pedal 10. This puts tension between the brake rods 16 and 22 causing the valve carrier members 76 and 78 to move apart to the extent of the lost motion provided by the pin 82 and the hole 84.

The relative motion between the members 76 and 78 swings the valve lever 86 in a counterclockwise direction about its fulcrum pin 88 and, through the clevis 94, and push rod 96, moves the valve plunger 138 to the right, first closing the vacuum valve 144 and then opening the air valve 142 to admit air to the controlled pressure chamber 108.

The air in the controlled pressure chamber 108 passes through the port 120 and the conduit 74 to the forward end of the power cylinder 34 and forces the piston 32 to the right, rotating the cross-shaft 27 in a counterclockwise direction to apply the brakes through the previously described linkages.

At the same time the air passes into the diaphragm chamber 132 through the passage 136 and exerts a force on the diaphragm proportional to the pressure admitted. This force tends to move the valve plunger back towards its original position and must be met by an equal force on the pedal if the brake is to remain applied to that extent.

Similarly the pedal must be continually depressed as long as brake applying movement of the cylinder 34 is continued else the movement of the brake rod 22 will be more rapid than that of the rod 16, whereupon the members of the valve carrier 18 will move toward each other and permit the valve to move into "lapped" position to prevent further brake applying movement.

An increase in pedal pressure will shift the valve to admit more air until the air pressure on the diaphragm again balances the pedal pressure, and similarly a slight release of pressure will permit the valve to shift in the opposite direction to evacuate some of the air until the air pressure on the diaphragm 128 is again in balance with the pedal pressure.

Thus it will be seen that I have provided a simple and compact arrangement of power brake means which provides the usual "followup" and in addition an accurately proportional reaction or "feel" on the brake pedal.

Also it will be noted that, if the vacuum system should fail, the brakes 64 may be applied manually without placing any undue strain on delicate valve parts, inasmuch as the forces would be transmitted directly through the carrier members 74 and 76 and the pin 82.

It will also be observed that the novel valve lever 80, through the unequal spacing of the pivots 86, 88 and 92, multiplies the relative motion of the carrier members, whereby adequate valve motion is provided without much loss in pedal travel, and at the same time the lever acts in the opposite direction to multiply the reactive force on the diaphragm 128 whereby an adequate reaction may be obtained by the use of a smaller and consequently more durable diaphragm.

While only one embodiment of my invention has been described in detail, it is not my intention to be limited to that embodiment or otherwise than by the terms of the appended claims.

I claim:

1. A vacuum braking system comprising brake operating linkage, a vacuum suspended vacuum power cylinder operably connected to said linkage, a brake pedal, a brake rod extending from said pedal and operably connected to said linkage, a valve carrier interposed between separate portions of the brake rod comprising two parts having a limited relative movement, a valve lever pivoted at spaced points on said two parts, and a valve operably engaged by said lever and secured to one of said parts, said valve having a control element actuated by said lever and a pressure responsive element constructed and arranged to react on the said control element to oppose movement thereof toward the brake "on" position.

2. A vacuum braking system comprising brake operating linkage, a vacuum suspended vacuum power cylinder operably connected to said linkage, a brake pedal, a brake rod extending from said pedal and operably connected to said linkage, a valve carrier interposed between separate portions of the brake rod comprising two parts having a limited relative movement, a valve lever actuable by relative movement of said two parts, and a valve operably engaged by said lever and secured to one of said parts, said valve having a control element actuated by said lever and a pressure responsive element subjected to the pressure transmitted by the valve to said power cylinder and constructed and arranged to oppose movement of the control element toward brake "on" position.

3. A vacuum braking system comprising brake operating linkage, a vacuum suspended vacuum power cylinder operably connected to said linkage, a brake pedal, a brake rod extending from said pedal and operably connected to said linkage, a valve carrier interposed between separate portions of the brake rod comprising two parts having a limited relative movement, a valve lever pivoted at spaced points on said two parts, and a valve operably engaged by said lever secured to one of said parts, said valve having a control rod actuable by said lever and a pressure responsive element constructed and arranged to react on the control rod to oppose movement thereof toward the brake "on" position, and the pivots of said valve lever on said carrier parts being at one end of the lever and closely adjacent said end and the engagement of said lever with the valve being at its other end whereby relative movement between the carrier parts is multiplied at said valve.

4. A vacuum braking system comprising brake operating linkage, a vacuum suspended vacuum power cylinder operably connected to said linkage, a brake pedal, a brake rod extending from said pedal and operably connected to said linkage, a valve carrier interposed between separate portions of the brake rod comprising two parts having a limited relative movement, a valve lever pivoted at spaced points on said two parts, and a valve operably engaged by said lever secured to one of said parts, said valve having a plurality of poppet valve elements and a pressure responsive element subjected to the pressure transmitted by the valve to said power cylinder and constructed and arranged to oppose movement of the valve toward brake "on" position, and the pivots of said valve lever on said carrier parts being at one end of the lever and closely adjacent said end and the engagement of said lever with the valve being at its other end whereby relative movement between the carrier parts is multiplied at said valve.

5. A vacuum braking system comprising brake operating linkage, a vacuum suspended vacuum power cylinder operably connected to said linkage, a brake pedal, a brake rod extending from said pedal and operably connected to said linkage, a valve carrier interposed between separate portions of the brake rod comprising two parts having a limited relative movement, a valve lever pivoted at spaced points on said two parts, and a valve operably engaged by said lever secured to one of said parts, said valve including a control element actuated by said lever, a plurality of poppet valve elements controlled in part by movements of said control element, and a pressure responsive element constructed and arranged to react on the said control element to oppose movement thereof toward the brake "on" position.

6. A vacuum braking system comprising brake operating linkage, a vacuum suspended vacuum power cylinder operably connected to said linkage, a brake pedal, a brake rod extending from said pedal and operably connected to said linkage, a valve carrier interposed between separate portions of the brake rod comprising two parts having a limited relative movement, a valve lever pivoted at spaced points on said two parts, and a valve operably engaged by said lever secured to one of said parts, said valve having a control rod actuated by said lever and a pressure responsive element subjected to the pressure transmitted by the valve to said power cylinder and connected to said control rod to oppose movement of the control rod toward brake "on" position.

7. A vacuum braking system comprising a source of vacuum, brakes, brake operating linkage, a power cylinder connected to said linkage, a conduit extending from said source of vacuum to one end of said power cylinder, a brake pedal, a brake rod connecting said pedal to said linkage, a control valve interposed between separate portions of said brake rod and operable by the separation thereof, a conduit extending from said source of vacuum to said valve, and a conduit extending from said valve to the other end of said power cylinder, said valve being operable to admit atmospheric air to said last named conduit to apply the brakes and being provided with a control element for operating the valve in response to the separation of said portions of the brake rod and a diaphragm responsive to the pressure of said air to oppose the valve operating movement of said control element.

8. A vacuum braking system comprising a source of vacuum, brakes, brake operating linkage, a power cylinder connected to said linkage, a conduit extending from said source of vacuum to one end of said power cylinder, a brake pedal, a brake rod connecting said pedal to said linkage, a control valve interposed between separate portions of said brake rod and operable by the separation thereof, a conduit extending from said source of vacuum to said valve, and a conduit extending from said valve to the other end of said power cylinder, said valve being operable to admit atmospheric air to said last named conduit to apply the brakes and being provided with a control element for operating the valve and an element responsive to the pressure of said air to oppose the operation of said control element, and said control valve being mounted on a valve carrier comprising two parts connected to the brake rod portions and having a limited relative movement.

9. A vacuum braking system comprising a source of vacuum, brakes, brake operating linkage, a power cylinder connected to said linkage, a conduit extending from said source of vacuum to one end of said power cylinder, a brake pedal, a brake rod connecting said pedal to said linkage, a control valve interposed between separate portions of said brake rod and operable by the separation thereof, a conduit extending from said source of vacuum to said valve, and a conduit extending from said valve to the other end of said power cylinder, said valve being operable to admit atmospheric air to said last named conduit to apply the brakes and being provided with a control rod and an element connected to said control rod, said last named element being responsive to the pressure of said air to oppose the operation of said valve, said control valve being mounted on a valve carrier comprising two parts connected to the brake rod portions and having a limited relative movement, and said valve being operated by a valve lever pivoted on said carrier parts at spaced points and engageable with said valve at a third point.

10. A vacuum braking system comprising brake operating linkage, a vacuum suspended vacuum power cylinder operably connected to said linkage, a brake pedal, a brake rod extending from said pedal and operably connected to said linkage, a valve carrier interposed between separate portions of the brake rod comprising two parts having a limited relative movement, a valve lever pivoted at spaced points on said two parts, and a valve operably engaged by said lever secured to one of said parts, said valve being further characterized as formed with an air chamber, a vacuum chamber and a controlled pressure chamber, air and vacuum ports for the respective communication of the first two chambers with the third, valve means controlled by relative movement of said two parts for alternately opening and closing said ports, means biasing the valve means to open the vacuum port, and means responsive to the pressure in the controlled pressure chamber for opposing movement of said valve means to open the air port.

11. A vacuum braking system comprising brake operating linkage, a vacuum suspended vacuum power cylinder operably connected to said linkage, a brake pedal, a brake rod extending from said pedal and operably connected to said linkage, a valve carrier interposed between separate portions of the brake rod comprising two parts having a limited relative movement, a valve lever pivoted at spaced points on said two parts, and a valve operably engaged by said lever secured to one of said parts, said valve being further characterized as formed with an air chamber, a vacuum chamber and a controlled pressure chamber, air and vacuum ports for the respective communication of the first two chambers with the third, valve means controlled by relative movement of said two parts for alternately opening and closing said ports, means biasing the valve means to open the vacuum port, and means responsive to the pressure in the controlled pressure chamber for opposing movement of said valve means to open the air port, said last named means comprising a diaphragm connected to said valve means and subjected on one side to the pressure in the vacuum chamber and on the other side to the pressure in said controlled pressure chamber.

12. A vacuum braking system comprising brake operating linkage, a vacuum suspended vacuum power cylinder operably connected to said linkage, a brake pedal, a brake rod extending from said pedal and operably connected to said linkage, a valve carrier interposed between separate portions of the brake rod comprising two parts having a limited relative movement, a valve lever pivoted at spaced points on said two parts, and a valve operably engaged by said lever secured to one of said parts, said valve being further characterized as formed with an air chamber, a vacuum chamber and a controlled pressure chamber, air and vacuum ports for the respective communication of the first two chambers with the third, valve means controlled by relative movement of said two parts for alternately opening and closing said ports, means biasing the valve means to open the vacuum port, and means responsive to the pressure in the controlled pressure chamber for opposing movement of said valve means to open the air port, said ports being arranged in opposed relationship at opposite ends of the controlled pressure chamber and having annularly disposed valve seats, and said valve means comprising a pair of poppet valves having their outer faces urged against said valve seats by a coiled spring compressed between their inner faces.

13. A vacuum braking system comprising brake operating linkage, a vacuum suspended vacuum power cylinder operably connected to said linkage, a brake pedal, a brake rod extending from said pedal and operably connected to said linkage, a valve carrier interposed between separate portions of the brake rod comprising two parts having a limited relative movement, a valve lever pivoted at spaced points on said two parts, and a valve operably engaged by said lever secured to one of said parts, said valve being further characterized as formed with an air chamber, a vacuum chamber and a controlled pressure chamber, air and vacuum ports for the respective communication of the first two chambers with the third, valve means controlled by relative movement of said two parts for alternately opening and closing said ports, means biasing the valve means to open the vacuum port, and means responsive to the pressure in the controlled pressure chamber for opposing movement of said valve means to open the air port, and said ports being arranged in opposed relationship at opposite ends of the controlled pressure chamber and having annularly disposed valve seats, and said valve means comprising a pair of poppet valves having their outer faces urged against said valve seats by a coiled spring compressed between their inner faces and a coaxially arranged plunger upon which said valves are slidably mounted and which is provided with spaced abutments respectively engageable with the outer faces of said valves to unseat them.

14. A vacuum braking system comprising brake operating linkage, a vacuum suspended vacuum power cylinder operably connected to said linkage, a brake pedal, a brake rod extending from said pedal and operably connected to said linkage, a valve carrier interposed between separate portions of the brake rod comprising two parts having a limited relative movement, a valve lever pivoted at spaced points on said two parts, and a valve operably engaged by said lever secured to one of said parts, said valve being further characterized as formed with an air chamber, a vacuum chamber and a controlled pressure chamber, air and vacuum ports for the respective communication of the first two chambers with the third, valve means controlled by relative movement of said two parts for alternately opening and closing said ports, means biasing the valve means to open the vacuum port, and means responsive to the pressure in the controlled pressure chamber for opposing movement of said valve means to open the air port, said last named means comprising a diaphragm connected to said valve means and subjected on one side to the pressure in the vacuum chamber and on the other side to the pressure in said controlled pressure chamber, said ports being arranged in opposed relationship at opposite ends of the controlled pressure chamber and having annularly disposed valve seats, and said valve means comprising a pair of poppet valves having their outer faces urged against said valve seats by a coiled spring compressed between their inner faces.

15. A vacuum braking system comprising brake operating linkage, a vacuum suspended vacuum power cylinder operably connected to said linkage, a brake pedal, a brake rod extending from said pedal and operably connected to said linkage, a valve carrier interposed between separate portions of the brake rod comprising two parts having a limited relative movement, a valve lever pivoted at spaced points on said two parts, and a valve operably engaged by said lever secured to one of said parts, said valve being further characterized as formed with an air chamber, a vacuum chamber and a controlled pressure chamber, air and vacuum ports for the respective communication of the first two chambers with the third, valve means controlled by relative movement of said two parts for alternately opening and closing said ports, means biasing the valve means to open the vacuum port, and means responsive to the pressure in the controlled pressure chamber for opposing movement of said valve means to open the air port, said last named means comprising a diaphragm connected to said valve means and subjected on one side to the pressure in the vacuum chamber and on the other side to the pressure in said controlled pressure chamber, and said ports being arranged in opposed relationship at opposite ends of the controlled pressure chamber and having annularly disposed valve seats, and said valve means comprising a pair of poppet valves having their outer faces urged against said valve seats by a coiled spring compressed between their inner faces and a coaxially arranged plunger upon which said valves are slidably mounted and which is provided with spaced abutments respectively engageable with the outer faces of said valves to unseat them.

16. A vacuum braking system comprising brake operating linkage, a vacuum suspended vacuum power cylinder operably connected to said linkage, a brake pedal, a brake rod extending from said pedal and operably connected to said linkage, a valve carrier interposed between separate portions of the brake rod comprising two parts having a limited relative movement, a valve lever pivoted at spaced points on said two parts, and a valve operably engaged by said lever secured to one of said parts, said valve being further characterized as formed with an air chamber, a vacuum chamber and a controlled pressure chamber, air and vacuum ports for the respective communication of the first two chambers with the third, valve means controlled by relative movement of said two parts for alternately opening and closing said ports, means biasing the valve means to open the vacuum port, and means responsive to the pressure in the controlled pressure chamber for opposing movement of said valve means to open the air port, said last named means comprising a diaphragm connected to said valve means and subjected on one side to the pressure in the vacuum chamber and on the other side to the pressure in said controlled pressure chamber, said ports being arranged in opposed relationship at opposite ends of the controlled pressure chamber and having annularly disposed valve seats, and said valve means comprising a pair of poppet valves having their outer faces urged against said valve seats by a coiled spring compressed between their inner faces and a coaxially arranged plunger upon which said valves are slidably mounted and which is provided with spaced abutments respectively engageable with the outer faces of said valves to unseat them, and said plunger being formed with an axial bore extending from said controlled pressure chamber to one side of said diaphragm.

17. A vacuum braking system comprising brake operating linkage, a vacuum suspended vacuum power cylinder operably connected to said linkage, a brake pedal, a brake rod extending from said pedal and operably connected to said linkage, a valve carrier interposed between separate portions of the brake rod comprising two parts having a limited relative movement, a valve lever pivoted at spaced points on said two parts, and a valve operably engaged by said lever secured to one of said parts, said valve being further characterized as having a controlled pressure chamber and a vacuum chamber, a valve plunger in the chambers controlled by relative movement of said two parts, and a diaphragm positioned at one side of one of the chambers opposite the other chamber, the valve being formed with a passage between the one chamber and the space on the nearer side of the diaphragm, and said plunger being formed with a longitudinal passage between the other chamber and the space on the farther side of the diaphragm.

18. A vacuum braking system comprising brake operating linkage, a vacuum suspended vacuum power cylinder operably connected to said linkage, a brake pedal, a brake rod extending from said pedal and operably connected to said linkage, a valve carrier interposed between separate portions of the brake rod comprising two parts having a limited relative movement, a valve lever pivoted at spaced points on said two parts, and a valve operably engaged by said lever secured to one of said parts, said valve being further characterized as having, in axial arrangement in the following sequence, an air chamber, a controlled pressure chamber, a vacuum chamber and a diaphragm chamber, a diaphragm in the diaphragm chamber, and a plunger controlled by relative movement of said two parts and extending through said chambers and connected to said diaphragm, the plunger being provided with valve means alternately providing communication between the first and second and the second and third chambers, said valve being formed with a passage between the vacuum chamber and the portion of the diaphragm chamber on the nearer side of the diaphragm, and the plunger being formed with a longitudinal passage between the controlled pressure chamber and the portion of the diaphragm chamber on the farther side of the diaphragm.

EARL R. PRICE.